United States Patent [19]

Meyer

[11] 4,405,085

[45] Sep. 20, 1983

[54] WATER DISTRIBUTING ASSEMBLY

[75] Inventor: Larry P. Meyer, Walla Walla, Wash.

[73] Assignee: Nelson Irrigation Corporation, Walla Walla, Wash.

[21] Appl. No.: 257,621

[22] Filed: Apr. 27, 1981

[51] Int. Cl.³ .............................................. B05B 3/18
[52] U.S. Cl. ................................. 239/178; 239/169; 239/177 R; 239/588; 239/710; 239/711; 285/404
[58] Field of Search ............................ 239/709–711, 239/718–721, 178–184, 177, 266–268, 169, 587, 588; 285/5, 404

[56] References Cited

U.S. PATENT DOCUMENTS

| 2,087,916 | 7/1937 | Lanninger | 285/5 |
| 2,211,519 | 8/1940 | Simmons | 239/169 |
| 2,243,597 | 5/1941 | Elliott | 239/169 |
| 2,321,778 | 6/1943 | Stout | 285/5 |
| 2,706,133 | 4/1955 | North, Jr. et al. | 239/588 |
| 3,117,725 | 1/1964 | Palmer | 239/169 |
| 3,310,239 | 3/1967 | Hesp et al. | 239/169 |
| 3,478,967 | 11/1969 | Horton et al. | 239/588 |
| 3,844,481 | 10/1974 | Livingston | 239/188 |
| 3,863,841 | 2/1975 | Berthoud | 239/266 |
| 3,870,235 | 3/1975 | Newell | 239/177 |

FOREIGN PATENT DOCUMENTS 374330  4/1923  Fed. Rep. of Germany ...... 239/719

Primary Examiner—John J. Love
Assistant Examiner—Michael J. Forman
Attorney, Agent, or Firm—Cushman, Darby & Cushman

[57] ABSTRACT

A water distributing assembly for use with a section of upwardly bowed rigid conduit supported at the opposite lower ends thereof by wheeled towers so that its longitudinal axis is disposed within a vertical plane for movement over a field in a direction transverse to said vertical plane. The water distributing assembly includes an inverted T-shaped pipe assembly for containing water under pressure having a plurality of sprinkler heads fixedly mounted in longitudinally spaced relation. A flexible hose assembly is provided for communicating the water under pressure in the conduit to the pipe assembly and sprinkler heads so as to accommodate five different adjustable movements between the pipe assembly and conduit provided by a clamping assembly.

11 Claims, 8 Drawing Figures

WATER DISTRIBUTING ASSEMBLY

This invention relates to agricultural irrigation and more particularly to improvements in agricultural irrigation sprinkler systems of the pivot move or lateral move type.

Pivot move agricultural systems are now in widespread use. A typical pivot move system provides a vertical water source pipe in the field and an elongated conduit assembly extending outwardly from the vertical pipe and supported for movement over the field by a plurality of wheeled towers spaced longitudinally therealong. The connection with the vertical source pipe permits the elongated conduit to be moved in a circular or angular relationship about the axis of the vertical pipe.

The conduit assembly is provided with a series of longitudinally spaced impact sprinkler heads which serve to distribute onto the field surface the water under pressure communicated with the conduit assembly through the vertical feed pipe as the conduit assembly is moved in a circular path over the field by the wheeled towers. The usual arrangement for effecting movement is to provide each tower with an electrical motor drivingly connected with the wheels although other power driven arrangements are sometimes utilized such as hydraulic pumps or the like. Proper guidance of the various power driven towers is achieved by providing the support for the conduit assembly through an articulated connection with each tower. The variation in speed required by virtue of the position of each tower with respect to the fixed pivotal axis of movement is accomplished by intermittently operating the power drive for the individual towers through sensors which determine the angle of the two conduit sections articulately supported by the particular tower. Usually, the outermost layer is utilized as the master from which all of the towers are guided in a master-slave relationship.

Lateral move systems are currently enjoying a degree of initial acceptance. These systems are similar to the pivot move systems in that they include an elongated conduit assembly supported in articulated relationship by a series of power driven wheeled towers. Lateral move systems differ from pivot move systems in that the movement of the conduit assembly over the field is essentially a translational movement rather than an angular movement about a fixed vertical axis. To accommodate this difference, the impact sprinkler heads usually employed in lateral move systems are more or less of the same size, whereas in pivot move systems they increase in size and capacity from the fixed feed pipe outwardly. Movement and guidance of a lateral move system is essentially the same as a pivot move system except, of course, it is necessary to provide some positive guidance for the master tower. This can be done by following a guide wire, furrow or other elongated arrangement capable of determining the path of movement of the master tower. In addition, it is necessary to provide a moving source of water under pressure. This is usually accomplished by providing a ditch to which wate is fed to supply the system and drawing water from the ditch by a pump carried by the master tower.

While systems of the type described above are currently receiving widespread acceptance, there are two areas where improvement is needed, namely reduction in the energy costs for effecting the movement of the water through the system and increase in the efficiency of distribution of the water from the system to the field surface. Impact sprinklers have been utilized in systems of this type because of their very favorable high capacity and low application rate. Impact sprinklers are shown to have a high capacity and low application rate due to the fact that they project the sourc of water outwardly into an essentially wedge-shaped instantaneous field pattern and then move the instantaneous pattern in a complete circle through the oscillation of the impact arm which, in turn, serves to achieve a better distribution of the water around the head itself. In order to achieve reliable impact operation and to maintain the droplet size of the projected stream at an efficient size, it is necessary to operate impact sprinkler heads at a relatively high pressure. The horsepower requirements to maintain a given pivot move system at a predetermined gallonage, can be materially reduced by reducing the required operating pressure of the system. Attempts to operate impact sprinklers at lower pressures have not been entirely satisfactory because of the necessity to increase the nozzle size in order to maintain the same gallonage. The combination of decreased operating pressure and increased nozzle size results in a substantial increase in the droplet size of the issuing stream. Increase in droplet size tends to cause surface damage which is undesirable in and of itself where surface contours must be maintained and is further undesirable because surface damage inhibits penetration and induces runoff. Moreover, attempts to operate impact heads at pressure levels of the order of 25 psi produce impact unreliability.

Spray heads when compared with impact heads have a relatively low capacity and a relatively high application rate. These characteristics result from the fact that the instantaneous spray pattern is stationary and is not moved by the operation of a spray head as is the case with an impact sprinkler head. On the other hand, spray heads can be satisfactorily operated at relatively low pressure so as to produce a favorable droplet size even at pressures where impact operation cannot be reliably achieved. Because spray heads thus offer the possibility of substantially reducing energy input costs by reducing operating input pressures, some farmers have attempted to utilize spray heads in lieu of impact heads. The use of spray heads in lateral move systems in lieu of impact heads provides a much simpler problem because of the essentially uniform rate of movement of the main conduit assembly. Under these circumstances the problem presented is a simple one of spreading out the instantaneous field pattern over as wide an area as possible. Some farmers have achieved effective pattern spread by utilizing an inverted T-shaped pipe assembly. Such assemblies have provided an elongated head carrying section to which a multiplicity of longitudinally spaced spray heads have been attached and an upright or upwardly extending mounting section which is rigidly secured in communicating relation with the conduit of the pivot or lateral move system. While modifications of this type have proven satisfactory on an individual farmer basis, there is still a need for commercially available equipment which would permit simple and universal cost effective modification of existing systems.

It is an object of the present invention to provide a spray head water distribution assembly for use in such systems in lieu of existing sprinkler heads which will meet the above described commercial needs. In accordance with the principles of the present invention, this objective is achieved by providing a T-shaped pipe assembly of the type described with a clamping assembly capable of operatively fixedly connecting the upper end portion of the mounting section with the conduit for the following five adjustable movements: (1) longitudinal movement of the T-shaped pipe assembly along the axis of the conduit so as to determine the longitudinal position of operation of the inverted T-shaped pipe assembly with respect to the conduit; (2) pivotal movement of the T-shaped pipe assembly about the longitudinal axis of the conduit so as to position the axis of the mounting section parallel with a vertical plane passing through the axis of the conduit; (3) pivotal movement of the T-shaped pipe assembly with respect to the conduit about an axis perpendicular to the aforesaid vertical plane so as to position the axis of the mounting section within a second vertical plane perpendicular to the first mentioned vertical plane; (4) vertical translational movement of the T-shaped pipe assembly with respect to the conduit so as to determine the height of operation of the spray heads mounted on the head carrying section thereof above the field surface; and (5) pivotal movement of the T-shaped pipe assembly about the axis of the mounting section so as to determine the angular extent of the longitudinal axis of said head carrying section with respect to the first-mentioned vertical plane. In addition, a flexible hose is provided for communicating the upper end of the mounting section with the conduit so that water under pressure within the latter is communicated with the T-shaped pipe assembly while accommodating any and all of the aforesaid five adjustable movements.

The combination of structural components embodied in the present assembly enables the operator to connect each such assembly to the conduit irrespective of the longitudinal position along the conduit which the assembly should assume operation. Usually the conduit assembly of the system, whether pivot move or lateral move, is made up of a series of rigid sections articulately interconnected. Usually each section is formed of metal, such as aluminum or the like, and is provided with an upwardly bowed configuration capable of cooperating with other reinforcing members to provide a truss construction articulately supported at each end by the adjacent two towers. By providing a clamping assembly and flexible water hose connection in the manner indicated above, a plurality of water distributing assemblies made up of this combination of components is suitable to replace the impact sprinkler heads normally provided in a conventional pivot move system or lateral move system. As indicated, the arrangement is particularly suited to utilization in lateral move systems, since under these circumstances there need not be any variation in the capacity of the pipe assembly or spray head components of each assembly. It will be understood, however, that by suitably varying the capacity and size of the assemblies, pivot move systems can be readily accommodated as well.

It is a further object of the present invention to provide a water distributing assembly of the type described which is simple in construction, effective in operation and economical to manufacture.

These and other objects of the present invention will become more apparent during the course of the following detailed description and appended claims.

Figure 1:
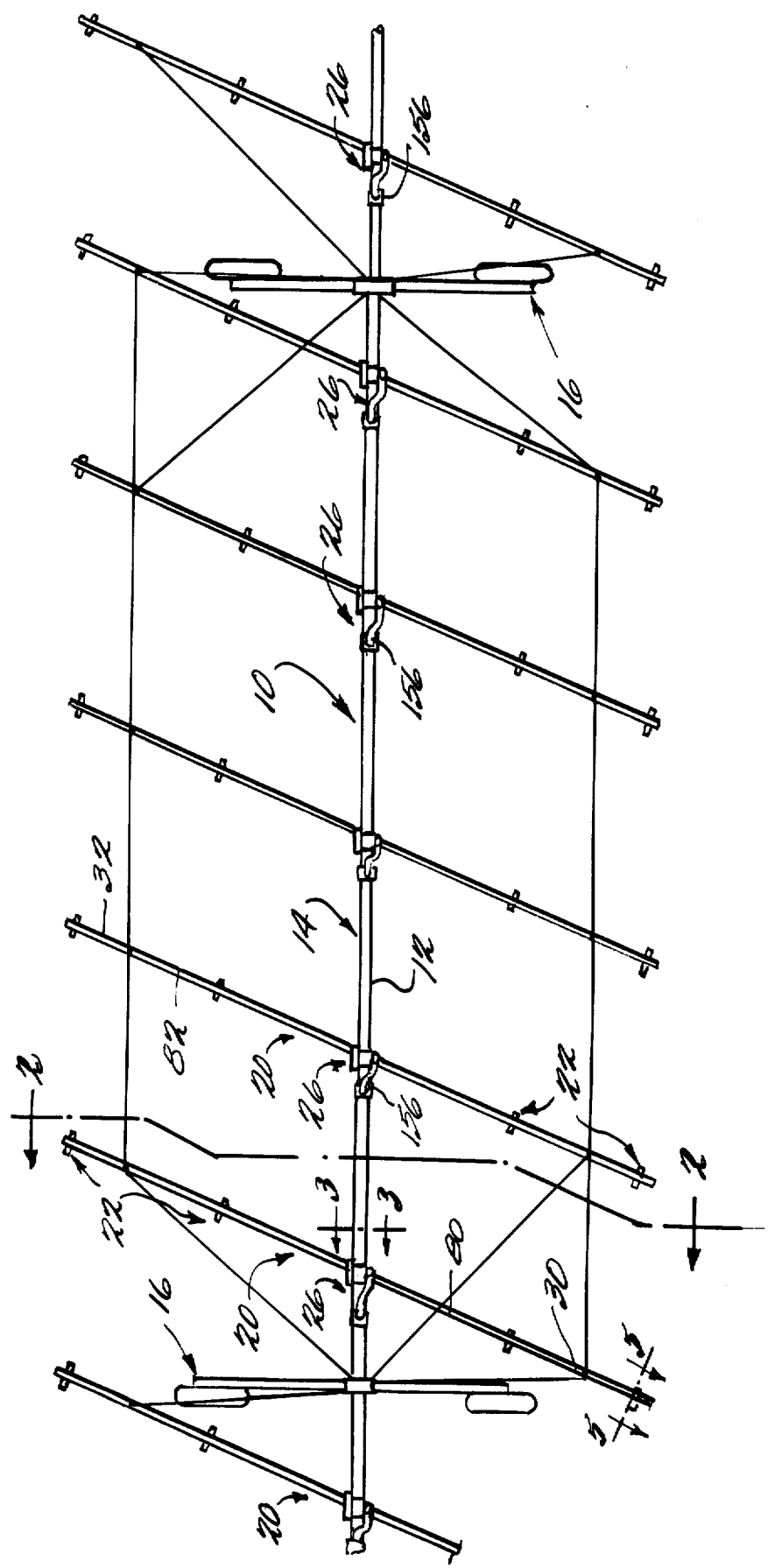
FIG. 1 is a top plan view of a portion of a conventional lateral move system modified to include a plurality of water distribution assemblies embodying the principles of the present invention in lieu of the impact sprinkler heads conventionally utilized therewith.

Referring now more particularly to FIG. 1 of the drawings, there is illustrated therein a section of a conventional lateral move agricultural irrigation system, generally indicated at 10. The portion of the system 10 shown includes one section 12 of a conduit assembly, generally indicated at 14, of the system 10. The conduit section 12 extends between two longitudinally spaced wheeled tower assemblies, generally indicated at 16. For purposes of the present invention it is necessary merely to understand that the conduit assembly 14 consists essentially of a series of articulately interconnected conduit truss assemblies each of which includes a rigid conduit section 12 which is conventionally bowed upwardly with its axis disposed in a vertical plane and maintained in such upwardly bowed relation by a plurality of truss elements which, for the sake of clarity, are not shown in the drawings. The power driven wheeled assemblies 16 are schematically shown in plan in FIG. 1 and in side elevation in FIG. 2. The detailed construction and operation of the wheeled towers are entirely conventional. The somewhat schematic illustrations of the wheeled towers in the drawings are provided to show the essential environmental relationships required of the present invention. In this regard it will be noted that the operation of the system 10 is such that the wheeled towers 16 serve to move the conduit assembly 14 over the field surface in a direction transverse to the aforesaid vertical plane.

Figure 5:
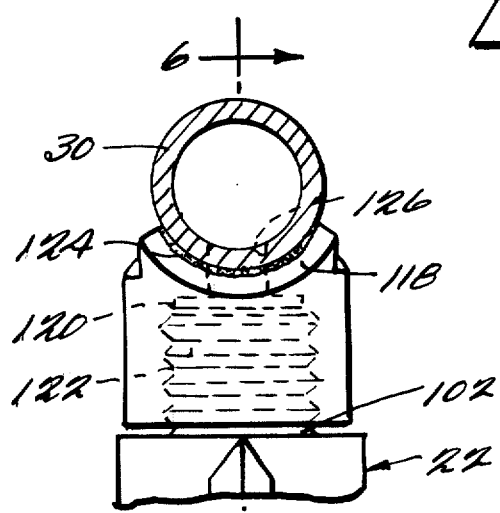
FIG. 5 is an enlarged fragmentary sectional view taken along the line 5—5 of FIG. 1.
Figure 6:
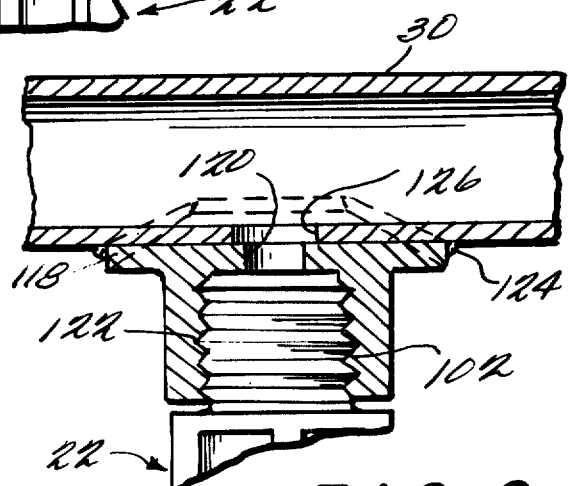
FIG. 6 is a sectional view taken along the line 6—6 of FIG. 5.

It will be understood that for purposes of the present invention the conduit assembly could just as well be a part of a conventional pivot move system, in which case the direction of movement of the system by virtue of the operation of the power driven wheeled towers is also transverse with respect to the aforesaid vertical plane, however, with a pivot move system the movement of the conduit assembly is generally arcuate about a fixed axis within the field whereas with the lateral move system shown the movement is essentially a translational movement. An important consideration to note with respect to the principles of the present invention is that in either case the conduit section 12 may have an upwardly bowed configuration which is indicated in FIG. 5.

It will be understood that the agricultural irrigation system 10 also includes means (not shown) supplying the conduit assembly 14 and specifically each rigid conduit section 12 thereof with a supply of water under pressure during the aforesaid movement over the field. A conventional system also provides means (not shown) for effecting the guidance of the conduit assembly 14 during its movement. Moreover, a multiplicity of longitudinally spaced impact sprinkler heads (not shown) are conventionally mounted in water pressure communicating relation with the conduit assembly 14 so that the water under pressure supplied thereto will be distributed by the impact sprinker heads onto the field surface therebelow during the operative movement of the conduit assembly.

Figure 2:
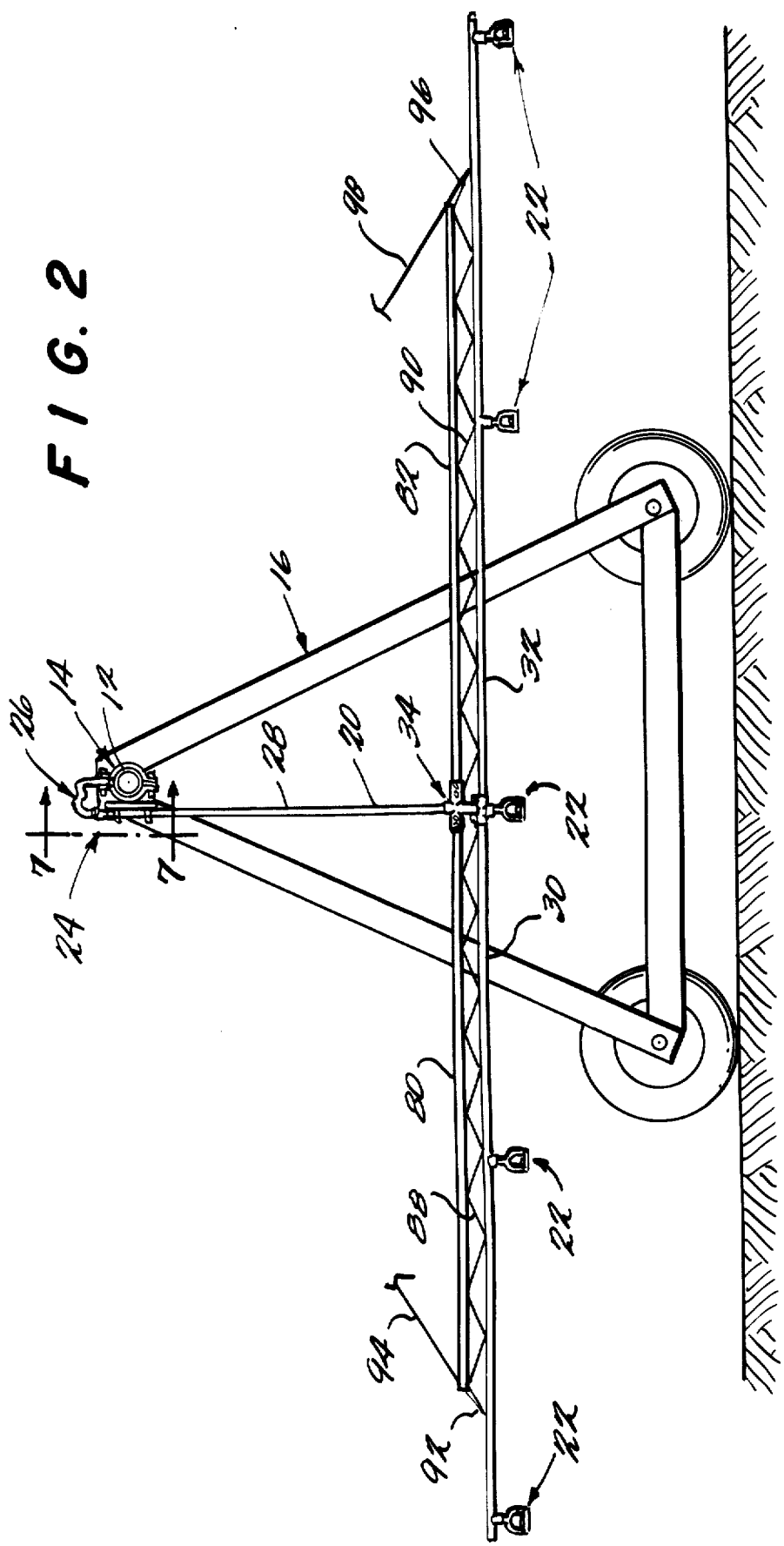
FIG. 2 is an enlarged fragmentary sectional view taken along the line 2—2 of FIG. 1.

The present invention is more particularly concerned with the construction and operation of a water distributing assembly, generally indicated at 18, which is utilized in the system 10 in lieu of the conventional impact sprinkler heads thereof. As best shown in FIG. 2, each water distributing assembly 18 consists essentially of an inverted T-shaped pipe assembly, generally indicated at 20, having a plurality of spray heads 22 mounted in horizontally spaced relation therealong, a clamping assembly 24 for adjustably fixedly connecting the pipe assembly 20 with the upwardly bowed conduit section 12 of the system 10 and a flexible hose assembly 26 for communicating the water under pressure within the conduit section 12 with the pipe assembly 20 so that during the movement of the system the water under pressure within the conduit will be distributed by the spray heads 22 onto the ground surface.

The T-shaped pipe section 20 is utilized in an inverted position and includes a mounting section in the form of a vertical metal pipe 28. The T-shaped pipe assembly 20 in addition to the vertical mounting section 28 also provides an elongated head carrying section arranged to be disposed with its longitudinal axis extending horizontally in operation. The head carrying section includes a pair of horizontally extending metal water pipes 30 and 32 which are fixedly secured in adjacent axially aligned relation to the lower end of the vertical pipe 28 by a fitting, generally indicated at 34.

Figure 3:
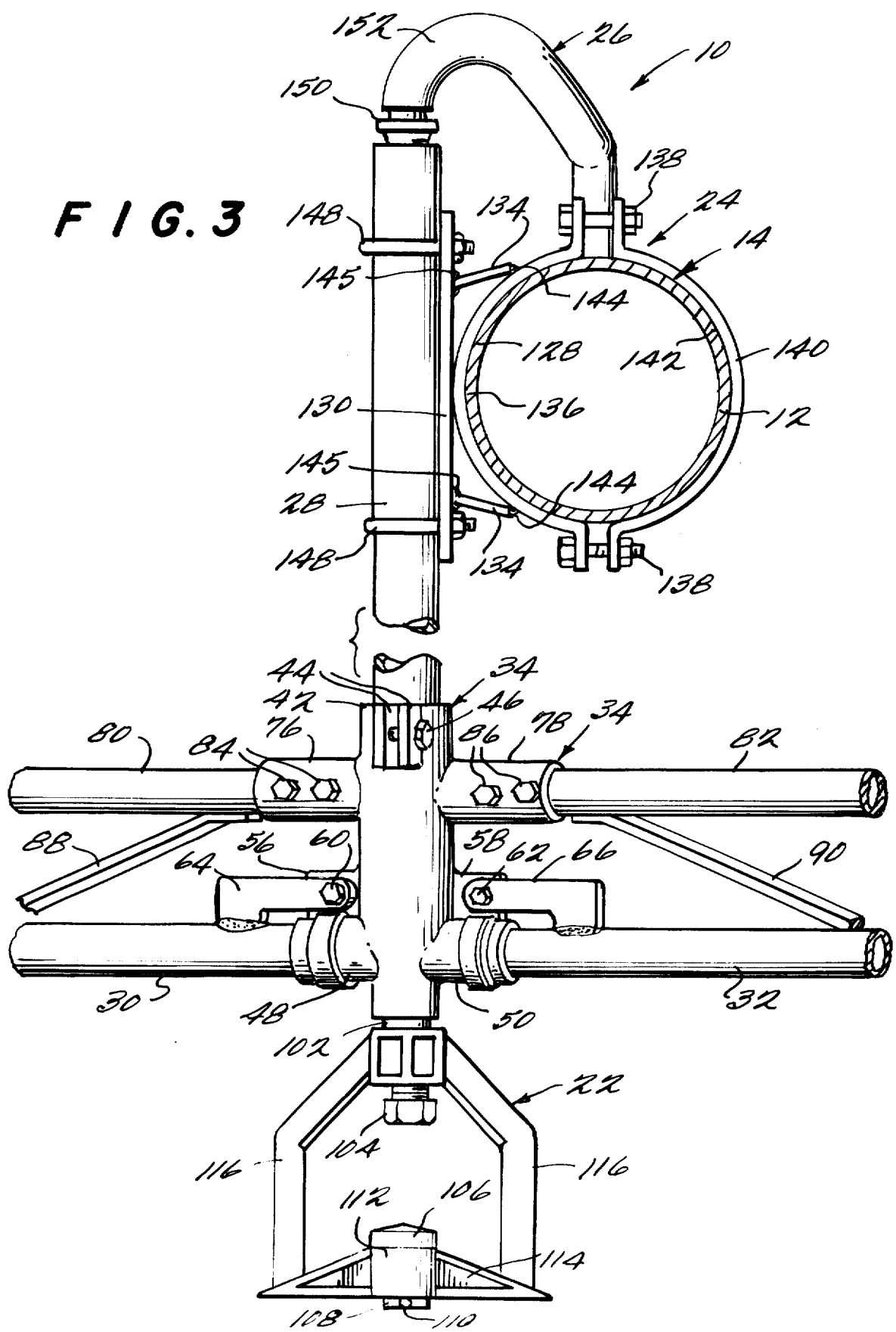
FIG. 3 is an enlarged fragmentary sectional view taken along the line 3—3 of FIG. 1.
Figure 4:
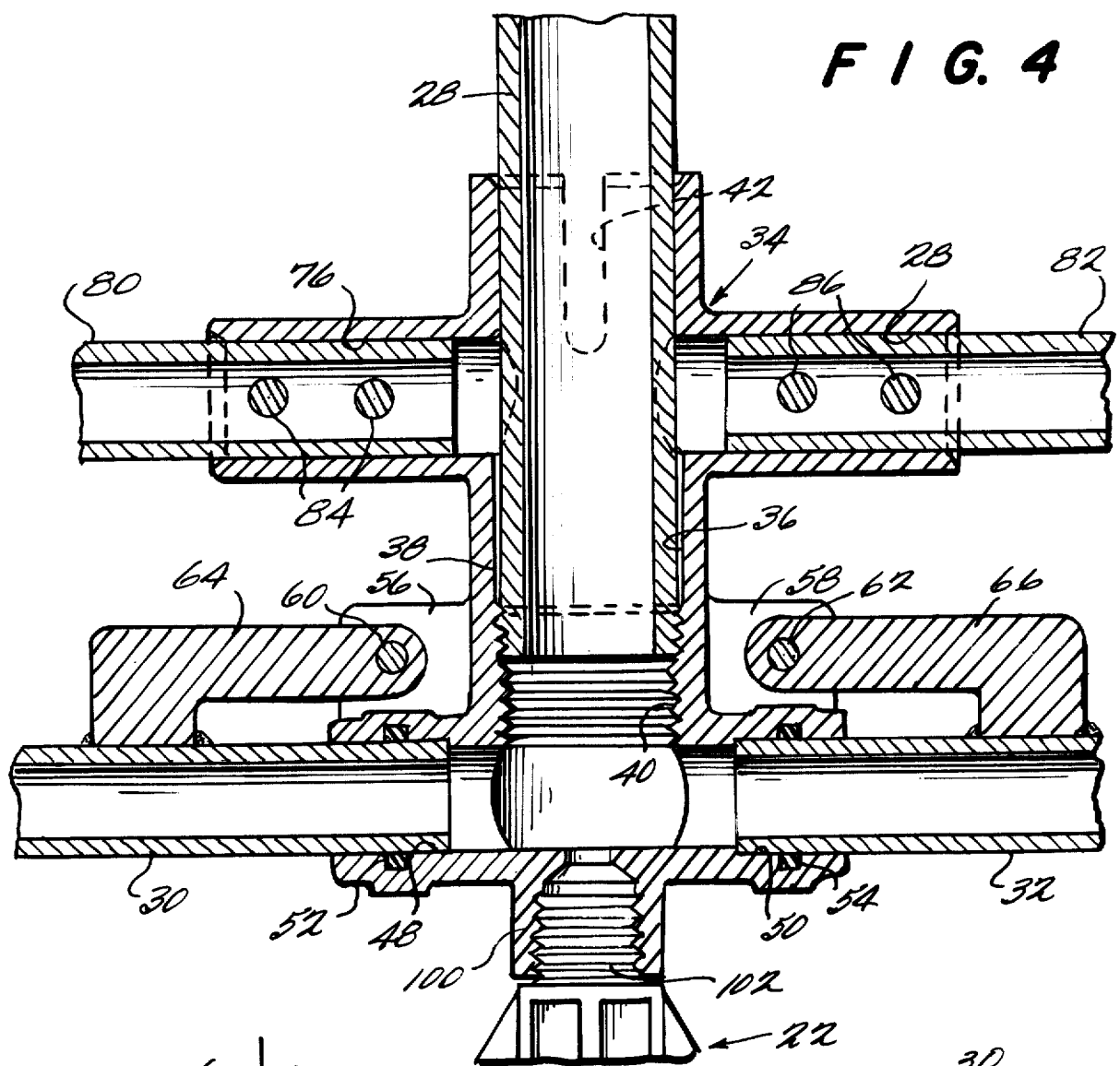
FIG. 4 is a vertical sectional view through the fitting of the pipe assembly.

As best shown in FIG. 4, the fitting 34 includes a vertically extending socket 36 for receiving downwardly therein the lower end of the vertical mounting pipe 28. Socket 36 is formed with two internally threaded sections 38 and 40 of different diameter size so as to enable the fitting 34 to cooperatively engage pipes 28 which may differ in size. As shown, the lower end of pipe 28 is threaded for engagement with the threaded section 38. The upper end of the fitting which defines the upper end of the socket 36 is formed with a pair of diametrically opposed splits or slots 42. As best shown in FIG. 3, a pair of integral lugs 44 is formed in the exterior of the fitting 34 adjacent opposite sides of each slot 42. Each pair of lugs 44 is centrally apertured to receive bolt assemblies 46 therethrough which aid in fixedly securing the vertical pipe 28 to the fitting 34.

Fitting 34 also includes a pair of oppositely directed horizontal sockets 48 and 50 which communicate with the lower end of the socket 36 and extend outwardly in opposite directions. The interior surfaces of the sockets 48 and 50 are grooved to receive annular seals 52 and 54 respectively. Seals 52 and 54 serve to engage the exterior periphery of pipes 30 and 32 when engaged within the sockets 48 and 50 respectively. It will also be noted that fitting 34 includes lugs 56 and 58 which are formed integrally with the exterior upper portion of the sockets 48 and 50 respectively. Lugs 56 and 58 are apertured to receive pins 60 and 62 which serve to connect one end of a pair of L-shaped retainer bars 64 and 66 in engagement therewith. The opposite ends of the retainer bars 64 and 66 are fixed as by welding or the like, to the adjacent upper surface of the metal pipes 30 and 32 respectively.

Fitting 34 also includes a second pair of horizontally extending sockets 76 and 78 which extend horizontally in opposite directions in positions above the sockets 48 and 50. Sockets 76 and 78 are adapted to receive one end of a pair of support pipes 80 and 82 which extend outwardly from the fitting 34 in opposite directions in positions spaced vertically above the water pipes 30 and 32. As shown, the end of the pipe 80 which engages within socket 76 is suitably apertured together with the socket 76 to receive mounting bolts 84. In a similar manner, the other sockets 78 and the end of the support pipe 82 engaged therein are apertured to receive mounting bolts 86.

The support pipe 80 is rigidly connected in supporting relation with the water pipe 30 disposed therebelow by a diagonal brace structure which, as shown, is preferably in the form of a metal bar 88 bent into a shallow accordian fold configuration. As best shown in FIG. 2, the length of support pipe 80 is considerably less than the length of the associated water pipe 30 and the supporting relationship between the two is achieved by welding the upper series of folds of the bar 88 to the lower surface of pipe 80 and the lower series of folds of the bar 88 to the upper surface of the water pipe 30. The other support pipe 82 is fixedly secured in supporting relation with the associated water pipe 32 by a similar bar 90 bent into a shallow accordian fold configuration and welded between the pipes in the manner previously indicated.

As best shown in FIG. 2 the outer end of the accordian fold bar 88 is provided with a lug 92 to which one end of a guy wire 94 may be conveniently connected. The opposite end of the guy wire extends to the conduit section 12 and is suitably secured thereto. A similar lug 96 is formed on the outer end of the accordian fold bar 90 so as to receive one end of a guy wire 98 which similarly extends to the conduit section 12 and is suitably secured at its other end thereto. An exemplary guy wire arrangement is shown in FIG. 1.

The longitudinaly extent of each of the pipes 30 and 32 is preferably of the order of 20 feet with each of the support pipes 80 and 82 having a length of approximately 15¼ feet. With these exemplary dimensions there is provided a series of five equally spaced spray heads 22, two of which are mounted on the outer ends of the pipes 30 and 32 respectively. The middle one of the five spray heads 22 is connected to the lower end of the fitting 34, as by an integral internally threaded socket 100 extending downwardly therefrom in communication internally with the sockets 36, 48 and 50.

As best shown in FIG. 3, each spray head 22 includes a molded plastic body which includes a threaded nipple 102 which is fixedly sealingly engaged within the threaded socket 100. The threaded nipple 102 constitutes an inlet which directs water under pressure from the fitting 34 downwardly to a closely adjacent threaded outlet receiving a spray nozzle 104. Nozzle 104 serves to direct the water under pressure communicated therewith in a stream downwardly onto a deflecting disc 106. The deflecting disc may have a flat water receiving surface or a shallow frustoconical surface which is either convex or concave. In the sprinkler head 22 shown in FIG. 3 the water deflecting disc 106 is separate from the molded body and is formed integrally on one end of a hollow mounting stem 108 having a pair of tabs 110 extending radially outwardly therefrom in diametrically opposed positions. The sprinkler head 22 includes an part of the main plastic molding a cylindrical portion 112 disposed below the disc 106 in a position to receive therethrough the hollow mounting sleeve 108 so that the lugs 110 engage below the lower surface thereof and serve to releasably lock the separate disc 106 in operative position. Cylindrical portion 112 forms an integral central portion of a lower base section 114 of the body molding which is interconnected with the threaded nipple portion 102 by a pair of arm portions 116 which extend downwardly and outwardly from the nipple portion and then downwardly into integral engagement with the base portion 114. For further details of the construction and design of the head 22, reference may be made to copending commonly assigned application Ser. No. 154,071 filed May 28, 1980, now Pat. No. D259,438, issued June 2, 1981, the disclosure of which is hereby incorporated by reference into the present specification.

FIG. 5 illustrates a preferred manner of mounting the two outer sprinkler heads 22 on the outer ends of the water pipes 30 and 32 as well as two intermediate spray heads 22 on the central portion of the pipes 30 and 32 respectively. As shown, the mounting includes a saddle shaped fitting 118 which is welded to the lower exterior surface of the tube 30 (or 32). The saddle fitting 118 includes a central opening 120 which leads to an internally threaded socket 122. The saddle fitting is welded to the exterior of the pipe 30 (or 32) as indicated at 124 so as to communicate the opening 120 with an opening 126 formed in the pipe wall. Weld 124 provides for the fixed securement of the saddle fitting to the pipe and the sealing of the opening 126 with respect to the opening 120. It will be understood that internally threaded socket portion 122 threadedly receives the threaded nipple portion 102 of the spray head 22.

Figure 8:
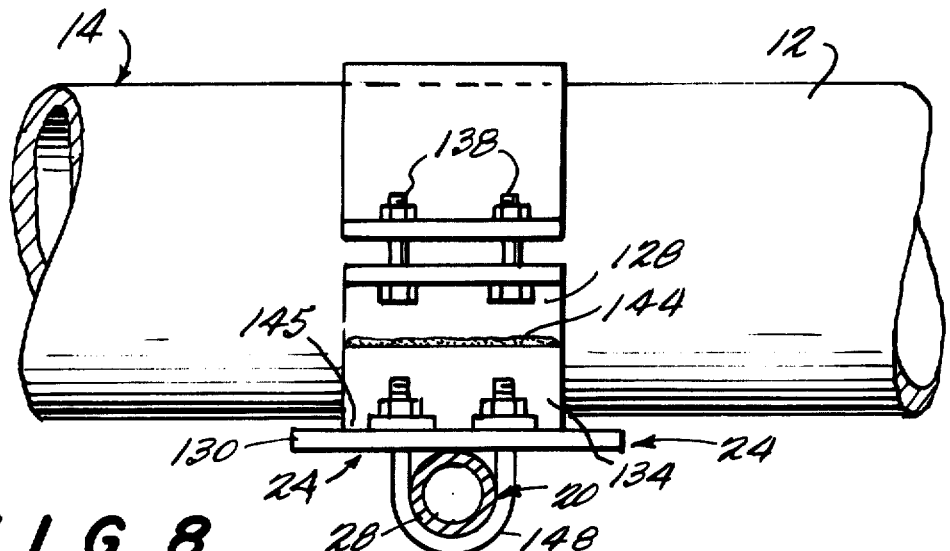
FIG. 8 is a fragmentary sectional view taken along the line 8—8 of FIG. 7.
Figure 7:
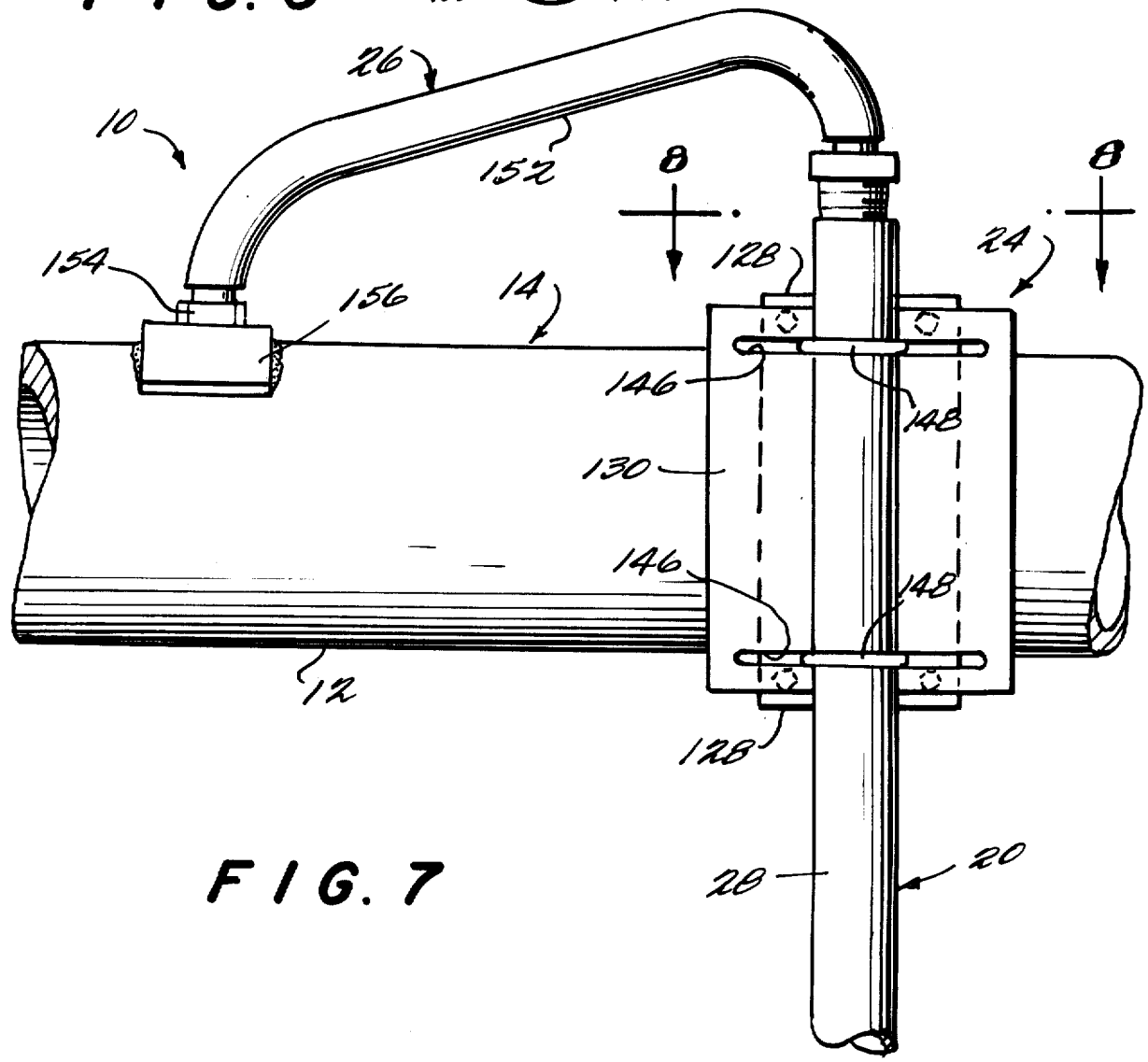
FIG. 7 is an enlarged fragmentary sectional view taken along the line 7—7 of FIG. 2.

Referring now more particularly to FIGS. 3, 7 and 8 of the drawings, the clamping assembly 24 includes a rigid structure made up of a bent metal strap 128, a flat metal plate 130 and a pair of metal bars 134. As best shown in FIG. 3, the metal strap 128 has its central portion bent into an arcuate configuration so as to define a horizontally open conduit engaging generally semi-cylindrical surface 136. The ends of the strap 128 are bent vertically in opposite directions and apertured to receive therethrough bolt assemblies 138. Bolt assemblies 134 form a part of a fastening means which serves to adjustably fix the rigid structure of the clamping assembly 24 to the conduit section 12 for adjustable movement pivotally about the axis of the conduit and/or longitudinally along the axis of the conduit. The fastening means includes a second strap 140 similar to the strap 128 having its central portion bent into an arcuate configuration providing a generally semi-cylindrical conduit engaging surface 142. As before, the end portions of the strap 140 are bent vertically in opposite directions and apertured to receive the bolt assemblies 138. It can be seen that the tightening of the bolt assemblies 138 serves to fixedly secure the rigid structure of the clamping assembly 24 to the conduit section 12 with the conduit engaging surfaces 136 and 142 of the straps 128 and 140 in engagement with the exterior periphery of the conduit section 12. Loosening of one or both of the bolt assemblies 138 permits the aforesaid pivotal or longitudinal adjustment of the rigid structure of the clamping assembly 24 with respect to the conduit section 12.

The pair of bars 134 is disposed within the rigid structure of the clamping assembly 24 in vertically spaced relation with respect to one another. One end of each bar 134 is welded to the adjacent portion of the exterior surface of the strap 128 opposite from the surface 136 as indicated at 144. The opposite end of each bar 134 is also rigidly secured, as by welding or the like, to one surface of the flat plate 130, as indicated at 145. Flat plate 130 has its opposite surface extending vertically so as to be engaged by the upper end of the vertical mounting pipe 28. Formed in the flat plate 130 in vertically spaced relation with respect to the associated plate edge is a pair of vertically spaced horizontally elongated U-bolt receiving slots 146.

A pair of U-bolt assemblies 148 serves to adjustably fixedly secure the upper end of the mounting pipe 28 in engagement with the flat vertical surface of the mounting plate 130. The adjusting movements include a vertical axial movement of the mounting pipe with respect to the rigid structure of the clamping assembly 24, a pivotal movement of the mounting pipe about its axis with respect to the rigid structure of the clamping assembly 24 and a pivotal, swinging, or tilting movement of the mounting pipe 28 in the plane of the pipe engaging surface of the flat plate 130. The pivoting, tilting, or swinging movement last mentioned is about an axis extending perpendicular to the vertical plate of the pipe engaging surface of the flat plate 130. Here again, these adjustments are provided by loosening the U-bolt assemblies 148 after which the fixed relationship is established by tightening the U-bolt assemblies.

Finally it will be noted that the upper end of the mounting pipe 28 is interiorly threaded to receive in fluid communicating relationship therewith a hose fitting 150 to which one end of a flexible hose 152 is connected. The opposite end of the hose 152 is connected with a fitting 154 which is adapted to sealingly engage within the socket 156 carried by the conduit 12 within the socket 156 carried by the conduit 12 within which the impact sprinkler head is normally mounted. It can be seen that the hose 152 which, together with the fittings 150 and 154 constitute the flexible hose assembly 26, will accommodate any one of the five following adjustments provided by the clamping assembly 25: (1) longitudinal movement of the T-shaped pipe assembly 20 along the axis of the conduit 12 so as to determine the longitudinal position of operation of the inverted T-shaped pipe assembly 20 with respect to the conduit; (2) pivotal movement of the T-shaped pipe assembly 20 about the longitudinal axis of the conduit 12 so as to position the axis of the mounting section or pipe 28 parallel with the pipe engaging vertical plane of the mounting plate 130; (3) pivotal movement of the T-shaped pipe assembly 20 with respect to the conduit 12 about an axis perpendicular to the aforesaid vertical plane so as to position the axis of the mounting section or pipe 28 within a second vertical plane perpendicular to the first-mentioned vertical plane; (4) vertical translational movement of the T-shaped pipe assemble 20 with respect to the conduit 12 so as to determine the height of operation of the spray heads 22 mounted on the head carrying section thereof above the field surface; and (5) pivotal movement of the T-shaped pipe assembly 20 about the axis of the mounting section or pipe 28 so as to determine the angular extent of the longitudinal axis of water pipes 30 and 32 of the head carrying section thereof with respect to the first-mentioned vertical plane.

By the utilization of the water distributing assemblies 18 of the present invention in a lateral move system 10 or pivot move system in lieu of the impact sprinkler heads previously embodied therein, the system 10 can be operated to distribute the same amount of water to the field surface but at a substantially lower operating pressure with the attended input energy cost savings. Such pressure may be as low as from 10 to 25 psi. Notwithstanding the very low operating pressures, the operation of each spray head 22 is such as to cause the stream issuing from the nozzle 104 thereof to be broken up into a very favorable and efficient water droplet size. Because water water distributing assembly 18 serves to distribute essentially the same amount of water (which was issuing from single nozzle of an impact sprinkler at one location on the conduit) from five nozzles at five spaced locations, an equivalent field surface pattern can be covered. Indeed, because the sprinkler heads 22 are closer to the ground and water is continously broken up within a pattern area which is moved solely by the movement of the system, a much more favorable environment for the application of the water to the ground is insured. Indeed, operating results seem to indicate that not only is it possible to effect operating cost savings by reducing the required operating pressures as compared with the conventional systems, but actual reduction in the amount of water required is also indicated by virtue of the better efficiencies achieved in application.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A water distributing assembly for use with a section of upwardly bowed rigid conduit having a first axis which extends longitudinally therein, said conduit being supported at the opposite lower ends thereof by wheeled towers to that its longitudinal axis is disposed within a vertical plane for movement over a field in a direction transverse to said vertical plane, said water distributing assembly including an inverted T-shaped pipe assembly for containing water under pressure, said inverted T-shaped pipe assembly including an elongated head carrying section having a second axis, said head carrying section being arranged to be disposed with said second axis extending horizontally in operation and a mounting section having a third axis, said mounting section being fixed at one end with the central portion of said head carrying section arranged so that said third axis extends vertically upwardly with respect to said second axis, a plurality of sprinkler heads fixedly mounted in longitudinally spaced relation on said head carrying section in water pressure communicating relation with respect thereto so that water contained within said T-shaped pipe assembly is communicated with said sprinkler heads and discharged therefrom in a plurality of spray patterns within the field therebelow, clamping means for operatively fixedly connecting the upper end portion of the mounting section with said conduit for the following five adjustable movements; (1) longitudinal movement of said T-shaped pipe assembly along said first axis so as to determine the longitudinal position of operation of the inverted T-shaped pipe assembly with respect to the conduit, (2) pivotal movement of the T-shaped pipe assembly about said first axis so as to position said third axis parallel with said vertical plane, (3) pivotal movement of the T-shaped pipe assembly with respect to the conduit about a fourth axis perpendicular to the aforesaid vertical plane so as to position said third axis within a second vertical plane perpendicular to the first-mentioned vertical plane, (4) vertical translational movement of the T-shaped pipe assembly with respect to the conduit so as to determine the height of operation of the sprinkler heads mounted on the head carrying section thereof above the field surface, and (5) pivotal movement of the T-shaped pipe assembly about said third axis so as to determine the angular extent of said second axis with respect to the first-mentioned vertical plane, and flexible hose means having one end connected with the upper end of the mounting section in fluid pressure communicating relation therewith and an opposite end adapted to be connected with the conduit for communicating water under pressure within said conduit to said T-shaped pipe assembly while accommodating any and all of the aforesaid five adjustable movements.

2. A water distributing assembly as defined in claim 1 wherein said clamping means includes a rigid structure providing a horizontally open generally semi-cylindrical surface for engagement with the exterior of the conduit and a generally vertically extending flat surface for engagement with the upper end of the mounting section of said T-shaped pipe assembly, fastening means for adjustably fixedly securing said rigid structure to the conduit with said semi-cylindrical surface in engagement with the exterior thereof and U-bolt assemblies for adjustably fixedly securing said rigid structure to said T-shaped pipe assembly with said flat surface in engagement with the upper end of the mounting section of said pipe assembly.

3. A water distributing assembly as defined in claim 2 wherein said rigid structure includes a metal strap having its central portion bent to provide said semi-cylindrical surface, a flat metal plate providing said flat surface and a pair of vertically spaced metal bars welded to the opposite surface of said bent strap and said flat plate.

4. A water distributing assembly as defined in claim 3 wherein said flat plate has formed therein in spaced relation to each plate end edge a horizontally elongated slot for receiving a U-bolt assembly therethrough.

5. A water distributing assembly as defined in claim 2, 3 or 4 wherein said fastening means includes a cooperating metal strap having its central portion bent to define a cooperating generally semi-cylindrical conduit engaging surface, said straps having their end portions bent outwardly in opposite directions, and bolt assemblies extending through the outwardly bent end portions of said straps.

6. A water distributing assembly as defined in claim 1, 2, 3 or 4 wherein said T-shaped pipe assembly includes a central fitting forming a common part of the mounting and head carrying sections thereof, said fitting having a pair of oppositely extending horizontal sockets and a vertical socket extending upwardly from between said pair of sockets in communicating relation therewith, said mounting section including a vertical water pipe having its lower end sealingly fixedly secured in said vertical socket, said head carrying section including a pair of aligned horizontal water pipes sealingly fixedly secured in said horizontal sockets and extending outwardly therefrom in opposite directions.

7. A water distributing assembly as defined in claim 6 wherein said fitting includes a second pair of oppositely horizontally extending sockets above said first-mentioned pair, a pair of horizontal support pipes fixedly mounted in said second pair of horizontal sockets and extending outwardly therefrom in opposite directions above said horizontal water pipes and diagonal brace means rigidly fixedly connected between each horizontal support pipe and the associated horizontal water pipe therebelow.

8. A water distributing assembly as defined in claim 7 wherein said diagonal brace means comprises an elongated metal bar bent into an accordian fold configuration, said horizontal support pipes and water pipes being metal, each of said metal horizontal pipes being welded to an associated series of accordian folds of an associated bent bar.

9. A water distributing assembly as defined in claim 6 wherein said fitting includes a second vertical socket extending downwardly from between said first pair of horizontal sockets in communicating relation therewith, one of said spray heads being fixedly sealingly engaged within said second vertical socket.

10. In a moving agricultural irrigation system of the type including a plurality of wheeled towers and elongated water conduit means having a first axis extending longitudinally thereof, said conduit means extending longitudinally between said wheeled towers in supported relation thereto for containing water under pressure movable by said wheeled towers over a field to be irrigated, and a plurality of water distributing assemblies carried by said conduit means in longitudinally spaced relation therealong for distributing water under pressure from said conduit means onto the adjacent portions of the field over which the conduit means is moved by said wheeled towers, the improvement which comprises each of said water distributing assemblies comprising an inverted T-shaped pipe assembly for containing water under pressure, said inverted T-shaped pipe assembly including an elongated head carrying section having a second axis, said head carrying section being disposed with said second axis extending horizontally and a mounting section having a third axis, said mounting section being fixed at one end with the central portion of said head carrying section with said third axis extending vertically upwardly with respect to said second axis, a plurality of sprinkler heads fixedly mounted in longitudinally spaced relation on said head carrying section in water pressure communicating relation with respect thereto so that water contained within said T-shaped pipe assembly is communicated with said sprinkler heads and discharged therefrom in a plurality of patterns within the field therebelow, clamping means for operatively fixedly connecting the upper end portion of the mounting section with said conduit means for the following five adjustable movements: (1) longitudinal movement of said T-shaped pipe assembly along said first axis so as to determine the longitudinal position of operation of the inverted T-shaped pipe assembly with respect to the conduit means, (2) pivotal movement of the T-shaped pipe assembly about said first axis so as to position said third axis parallel with a vertical plane passing through said first axis, (3) pivotal movement of the T-shaped pipe assembly with respect to the conduit means about a fourth axis perpendicular to the aforesaid vertical plane so as to position said third axis within a second vertical plane perpendicular to the first-mentioned vertical plane, (4) vertical translational movement of the T-shaped pipe assembly with respect to the conduit means so as to determine the height of operation of the sprinkler heads mounted on the head carrying section thereof above the field surface, and (5) pivotal movement of the T-shaped pipe assembly about said third axis so as to determine the angular extent of said second axis with respect to the first mentioned vertical plane, and flexible hose means having one end connected with the upper end of the mounting section in fluid pressure communicating relation therewith and an opposite end connected with the conduit means for communicating water under pressure within said conduit means to said T-shaped pipe assembly while accommodating any and all of the aforesaid five adjustable movements.

11. The improvement as defined in claim 10 including guy wire means anchored to said system and connected with the ends of the head carrying sections of said water distributing assemblies to stabilize the same during operation.

* * * * *